United States Patent [19]
Dickson et al.

[11] Patent Number: 5,272,550
[45] Date of Patent: Dec. 21, 1993

[54] HOLOGRAM SYSTEM

[75] Inventors: LeRoy D. Dickson, Morgan Hill; Francis S. Luecke, San Jose, both of Calif.

[73] Assignee: International Business Machines Corporation, Armonk, N.Y.

[21] Appl. No.: 939,563

[22] Filed: Sep. 2, 1992

Related U.S. Application Data

[63] Continuation-in-part of Ser. No. 774,410, Oct. 10, 1991, abandoned.

[51] Int. Cl.⁵ ............ G02B 5/30; G02B 5/32; G03H 1/18; G03H 1/26
[52] U.S. Cl. .................... 359/3; 359/15; 359/19; 359/22; 359/485; 369/103
[58] Field of Search .............. 359/15, 19, 24, 3, 22, 359/25, 485; 369/109, 110, 103

[56] References Cited

U.S. PATENT DOCUMENTS

| | | | |
|---|---|---|---|
| 3,560,210 | 2/1971 | Grobin, Jr. | 359/24 |
| 4,497,534 | 2/1985 | Sincerbox . | |
| 4,794,585 | 12/1988 | Lee | 359/15 |
| 4,795,223 | 1/1989 | Moss | 359/24 |
| 4,824,191 | 4/1989 | Kato et al. . | |
| 4,945,529 | 7/1990 | Ono et al. | 359/15 |
| 4,946,253 | 8/1990 | Kostuck | 359/15 |
| 5,013,107 | 5/1991 | Biles | 369/109 |
| 5,016,954 | 5/1991 | Onayama et al. | 359/15 |
| 5,056,881 | 10/1991 | Bowen et al. | 359/24 |
| 5,085,496 | 2/1992 | Yoshida et al. | 359/485 |
| 5,103,323 | 4/1992 | Magarinos et al. | 359/24 |

FOREIGN PATENT DOCUMENTS

| | | |
|---|---|---|
| 61-123032 | 6/1986 | Japan . |
| 62-219340 | 9/1987 | Japan . |
| 63-25845 | 2/1988 | Japan . |
| 1-13246 | 1/1989 | Japan . |
| 1-55745 | 3/1989 | Japan . |
| 1-55746 | 3/1989 | Japan . |
| 1-86332 | 3/1989 | Japan . |
| 1-86337 | 3/1989 | Japan . |
| 1-153359 | 3/1989 | Japan . |
| 1-146143 | 6/1989 | Japan . |

*Primary Examiner*—Martin Lerner
*Attorney, Agent, or Firm*—Douglas R. Millett

[57] ABSTRACT

A first volume hologram diffracts a portion of the beam of light as a first beam and transmits the remaining portion of the beam of light as a second beam. A second volume hologram diffracts either the first or the second beam to a desired angle and transmits the remaining beam undiffracted. Desired beam separations at desired angles may thereby be achieved for use in optical data storage systems.

18 Claims, 11 Drawing Sheets

HOLOGRAM SYSTEM

This application is a continuation-in-part of U.S. patent application Ser. No. 07/774,410, filed Oct. 10, 1991, now abandoned.

BACKGROUND OF THE INVENTION

1. Field of the Invention

The present invention relates generally to volume holograms and more specifically to volume holograms for use in optical data storage systems.

2. Description of the Prior Art

Holograms are recordings of light intensity patterns created by the interference of two beams of mutually coherent light (the two beams are usually obtained by splitting a single laser beam). There are two major categories of holograms: transmissive and reflective. These two categories are further divided into two physical types of holograms: surface relief holograms and volume holograms. Surface relief holograms can be recorded using photolithographic processes. The interference pattern is recorded as a periodic variation in thickness of the material while the refractive index of the material remains fixed.

In a volume hologram, the interference pattern is recorded as a periodic variation in the refractive index of the material while the thickness of the material remains fixed. The periodic variation in refractive index creates surfaces of peak refractive index within the material. These surfaces are referred to as "Bragg surfaces." When the interference pattern is created by two plane waves or two waves with identical curvature at the hologram surface, the Bragg surfaces will be Bragg planes.

When the hologram is re-illuminated by one of the original beams at an angle that results in maximum diffraction efficiency, the internal angle of the beam relative to the Bragg planes is referred to as the "Bragg angle." The external angle of incidence at which maximum diffraction efficiency occurs is also often referred to as the Bragg angle.

Recently, surface relief holograms have been used for optical data storage applications. These holograms allow beams of light to be separated for various purposes. These surface relief hologram systems include the following Japanese applications: JP 1-13246, published Jan. 18, 1989; JP 1-55745, published Mar. 2, 1989; JP 1-55746, published Mar. 2, 1989; JP 1-86337, published Mar. 31, 1989; JP 1-86332, published Mar. 31, 1989; JP 1-146143, published Jun. 8, 1989; JP 1-53359, published Mar. 1, 1989; JP 63-25845, published Feb. 3, 1988; JP 62-219340, published Sep. 26, 1987; and JP 61-123032, published Jun. 10, 1986.

A problem with surface relief holograms is that they are not able to achieve efficient polarization separation except for a limited range of diffraction angles. Polarization separation is very important in magneto-optic systems where the data is sensed as changes in the plane of polarization of light reflected from the optical media.

Volume holograms can be used to do polarization separation over a wide range of diffraction angles. U.S. Pat. No. 4,497,534 issued Feb. 5, 1985 shows the use of a volume hologram for polarization separation. However, volume holograms are limited in thickness to approximately 25 microns and this results in beam separations at relatively large angles of 30–45 degrees. Smaller beam angle separations are preferred in optical storage systems so that the optical sensors may be located close together and preferably in a single package.

What is needed is a volume hologram system which can achieve beam separation at desired angles.

SUMMARY OF THE INVENTION

Briefly, in a preferred embodiment, the present invention comprises a radiation source for providing a beam of radiation. A first volume hologram and a second volume hologram are recorded on opposite sides of a substrate, or alternatively, each hologram may be recorded on a separate substrate and then the two substrates may be cemented together. The first hologram diffracts a portion of the beam of light as a first beam and transmits the remaining portion of the beam of light as a second beam. The second hologram diffracts either one of the first beam or the second beam to a desired angle and transmits the remaining beam undiffracted. The first hologram provides the desired beam separation while the second hologram provides the desired angle between the beams. For a fuller understanding of the nature and advantages of the present invention, reference should be made to the following detailed description taken in conjunction with the accompanying drawings.

DESCRIPTION OF THE PREFERRED EMBODIMENTS

Figure 1:
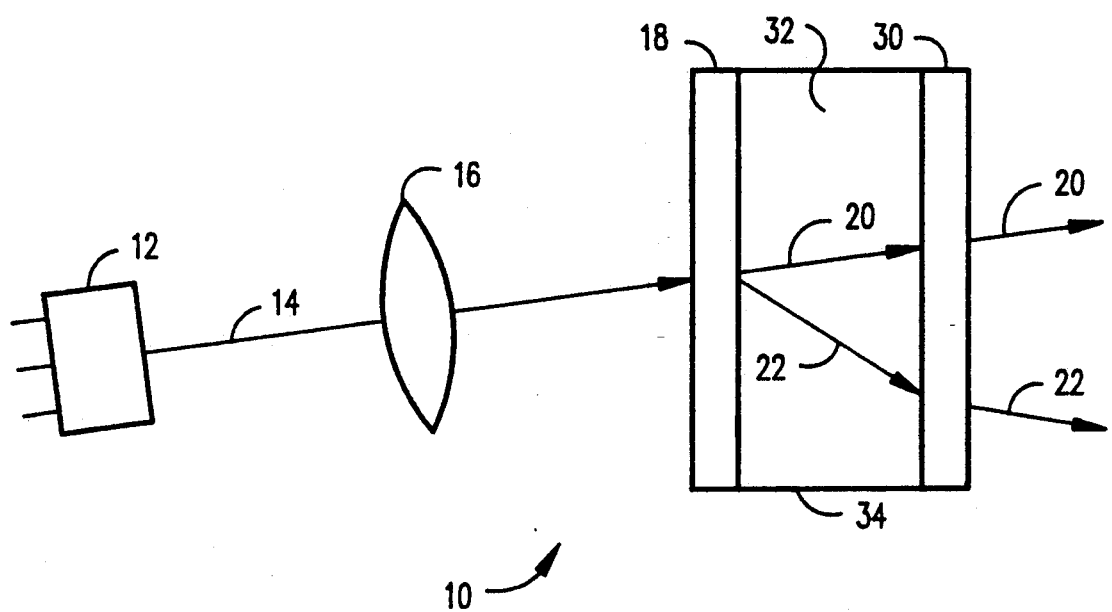
FIG. 1 is a schematic diagram of a hologram system of the present invention.

FIG. 1 shows a schematic diagram of a hologram system of the present invention and is designated by the general reference number 10. System 10 has a laser diode 12 which produces a light beam 14. Laser diode 12 may be a gallium-aluminum-arsenide laser diode which generates a light beam at approximately 780 nanometers in wavelength. The beam 14 is collimated by a lens 16. Beam 14 then passes to a beamsplitter hologram 18. Beam 14 hits hologram 18 at the Bragg angle of hologram 18. Hologram 18 splits beam 14 into a transmitted beam 20 and a diffracted beam 22. Beams 20 and 22 may have selected power levels and/or polarization percentages.

Beams 20 and 22 pass to a beam directing hologram 30. Beam 22 hits hologram 30 at the Bragg angle of hologram 30 and is diffracted. Beam 20 hits hologram 30 at a non-Bragg angle such that it is transmitted undiffracted. The beam 22 is diffracted to a new desired angle relative to beam 20. Hologram 18 splits the beams 20 and 22 at a highly divergent angle. Hologram 30 is needed to modify the angle between the two beams.

Holograms 18 and 30 are recorded on a substrate 32. Alternatively, holograms 18 and 30 may be recorded on separate substrates and then the substrates may be cemented together. The combination of holograms 18 and 30 and substrate 32 is referred to as a hologram assembly 34.

Figure 2:
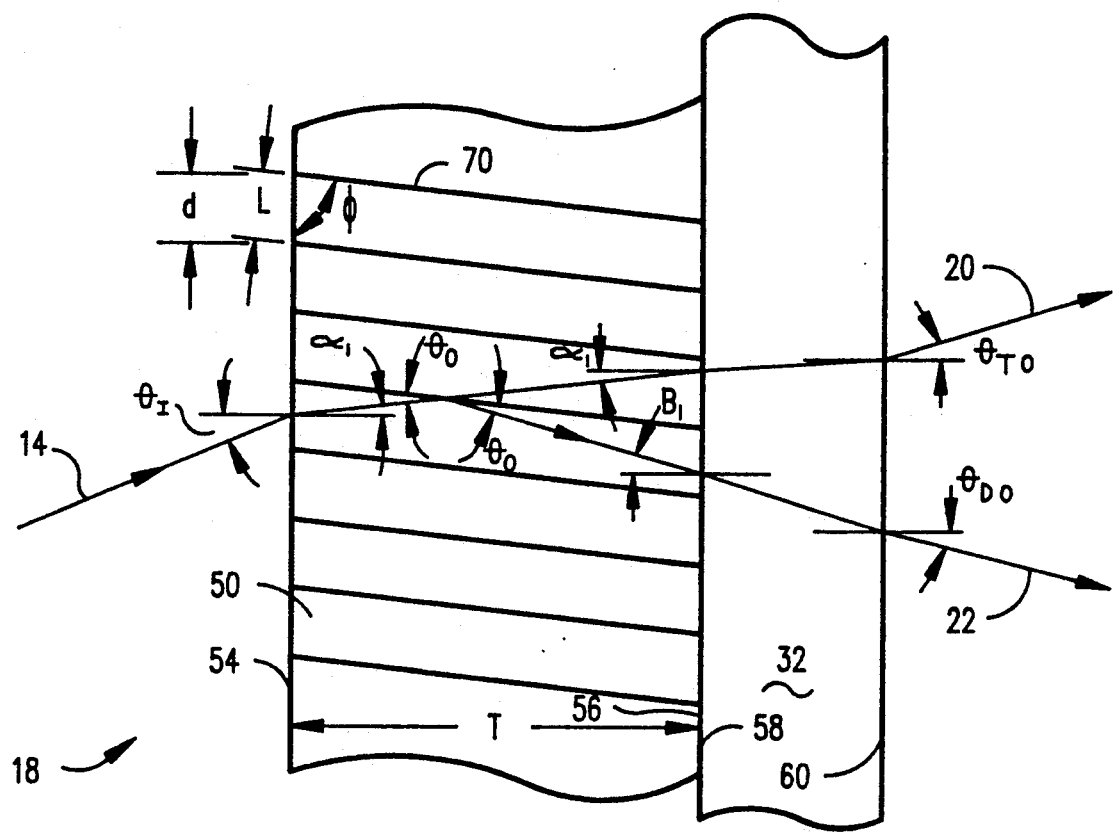
FIG. 2 is a cross sectional view of a hologram of the present invention.

FIG. 2 shows a detailed cross sectional view of hologram 18 in the present invention. Hologram 18 comprises a hologram material 50 deposited to a thickness T on substrate 32. The hologram material is preferably dichromated gelatin and the substrate is preferably glass. Hologram material 18 has a surface 54 and 56, and substrate 32 has a surface 58 and 60.

The hologram material 18 has been manufactured with periodic Bragg planes 70. The Bragg planes 70 have a separation distance L, an external fringe spacing distance d and an angle $\phi$ relative to surface 54.

In operation, the input beam 14 (having a wavelength $\lambda_1$) enters hologram 18 at surface 54 at an angle $\theta_1$ with respect to the perpendicular. The beam 14 enters the material 50 at an internal incidence angle ($\alpha_1$=asin ($\sin\theta_1/n_o$) where $n_0$ is the average index of refraction of material 50 (typically 1.26). This change in angle is due to refraction. A portion of beam 14 travels through material 50 without experiencing any diffraction and exits substrate 32 as beam 20. Note that beam 20 experiences refraction at surfaces 56 and 60. This is because material 50 and substrate 52 have different indices of refraction. However, these refractions are equal and opposite so they cancel each other. Beam 20 exits surface 60 at a transmitted output angle of $\theta_{TO}$. $\theta_{TO}$ is equal to $\theta_I$ and beam 20 will appear to be transmitted through hologram 14 without diffraction. A portion of beam 14 is diffracted by the Bragg planes 70. The angle of beam 14 relative to Bragg plane 70 is $\theta_0$ and is equal to asin [$\lambda_1/2n_0L$]. The diffracted beam encounters surface 56 at an internal diffraction angle $\beta_1$. The diffracted beam exits substrate 32 at surface 60 as beam 22. Again, there is refraction at surfaces 56 and 60. Beam 22 exits surface 60 at a diffracted output angle of $\theta_{Do}$. $\theta_{Do}$ equals asin [$n_o\sin\beta_1$]. The exact properties of beams 20 and 22 are described in more detail below.

In designing the hologram 18, the following variables are taken into account:

$\theta_I$=angle of incidence (external).
$\alpha_1$=angle of incidence (internal).
$\beta_1$=angle of diffraction (internal).
$\delta$=deviation from the Bragg angle. Assumed to be equal to zero.

$\phi$ = tilt of Bragg planes,
= $\pi/2$ for no tilt.

L=separation of the Bragg planes.
T=thickness of hologram material.
d=external fringe spacing.
$n_0$=average refractive index of the hologram medium, typically 1.26 for an exposed and processed dichromated gelatin holographic grating with high $n_1$.

$n_1$=Peak change in index of refraction of the hologram medium. Typically 0.1 for dichromated gelatin.
$\lambda_a$=wavelength of light in air. Here $\lambda_a=\lambda_1=780$ nm.
$\delta\lambda$=deviation from $\lambda_a$ (Bragg $\lambda$). Assumed to be equal to zero.

These variables are used in the following formulas:

$$\alpha = a\sin\left[\frac{\sin[\theta_1]}{n_0}\right] \quad (1)$$

$$\phi = \frac{\pi}{2} - \frac{\beta - \alpha}{2} \quad (2)$$

$$\theta_0 = \alpha + \frac{\pi}{2} - \phi \quad (3)$$

$$L = \frac{\lambda_a}{2n_0\sin[\theta_0]} \quad (4)$$

$$d = \frac{L}{\sin(\phi)} \quad (5)$$

$$C_R = \cos(\alpha) \quad (6)$$

$$C_S = \cos(\alpha) - \frac{\lambda_a}{n_0 L}\cos(\phi) \quad (7)$$

$$N = \pi n_1 \frac{T}{\lambda_a \sqrt{C_R C_S}} \quad (8)$$

$$\Gamma = 2\pi\delta\frac{\sin[\phi - \theta_0]}{L} - \delta\lambda\frac{\pi}{n_0 L^2} \quad (9)$$

$$S = \Gamma\frac{T}{2C_S} \quad (10)$$

$$E_S = \frac{[\sin[\sqrt{N^2 + S^2}]]^2}{1 + \frac{S^2}{N^2}} \quad (11)$$

$$E_P = \frac{[\sin[\sqrt{[N\cos[2\theta_0]]^2 + S^2}]]^2}{1 + \frac{S^2}{[N\cos[2\theta_0]]^2}} \quad (12)$$

Formulas 11 and 12 above give the diffraction efficiencies for the S and P orthogonal polarization components and determine the conditions of the beams 20 and 22. Es is the diffraction efficiency of the S polarized light component and Ep is the diffraction efficiency of the P polarized light component. The S and P represent the orthogonal polarization components of the light. A more detailed discussion of hologram mathematics is given by Herwig Kogelnik in "Coupled Wave Theory for Thick Hologram Gratings," Bell System Technical Journal, Vol. 48, No. 9, p. 2909 (November 1969).

Figure 3:
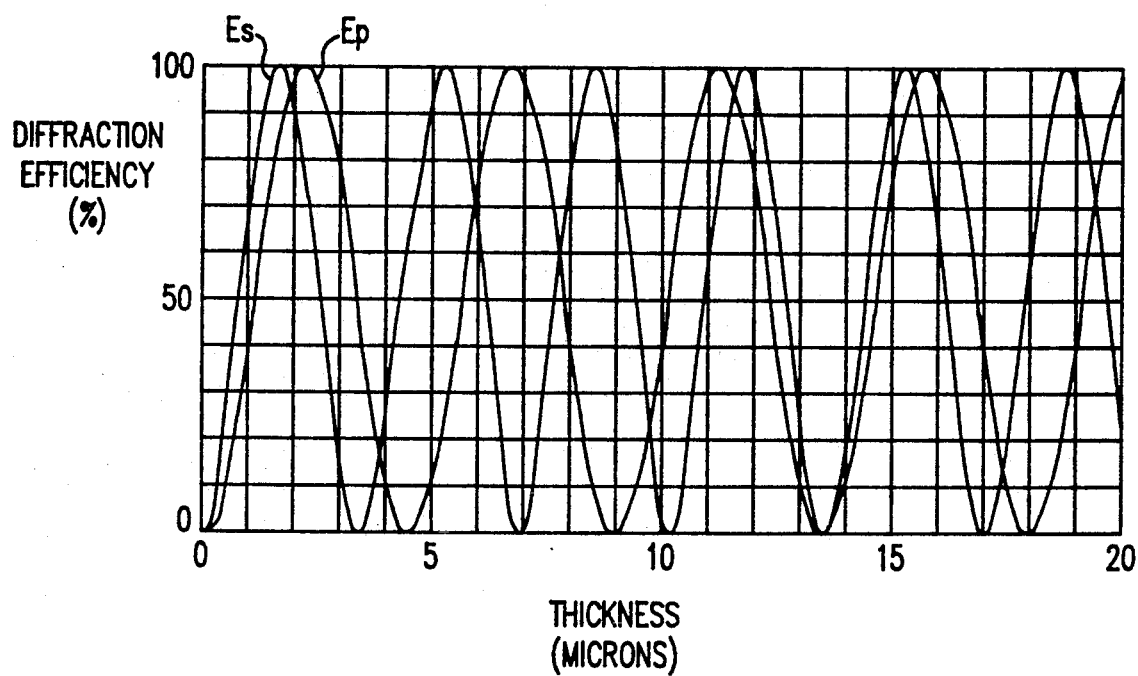
FIG. 3 is a graph of diffraction efficiency versus hologram thickness.

FIG. 3 shows a graph of diffraction efficiency for Es and Ep versus the thickness T of the material 50 for $\theta_I=0$ degrees, $\beta_1=41.41$ degrees, $n_0=1.26$, $n_1=0.2$, and 780 nm. The diffraction efficiency represents the percentage of beam 14 which will be diffracted as beam 22. The remaining portion of beam 14 will continue as beam 20. For example, at a thickness T equals 6.75 microns, 100 percent of the P polarized light will be diffracted as beam 22 and zero percent of the S polarized light will be diffracted. Beam 22 will have 100 percent P polarized light and zero percent S polarized light while beam 20 will have 100 percent S polarized light and zero percent P polarized light. In such a case, the hologram 18 functions as a polarization beamsplitter.

Beams 20 and 22 may both contain S and P polarization components. For example, at T equals 3 microns, beam 22 will have 12 percent of the S polarized light and 75 percent of the P polarized light of beam 14. Beam 20 will have 88 percent of the S polarized light and 25 percent of the P polarized light of beam 14.

If polarization components are not a consideration, hologram 18 may also be used as a variable power beamsplitter. For example, at T equals 7.72 microns, beam 22 will contain 61 percent of the light of beam 14 and beam 20 will contain 39 percent of the light of beam 14. Each beam will then contain equal portions of the two orthogonal polarization components.

In the case of hologram 30, if it is desired to diffract 100 percent of the beam 22 to a desired angle, a thickness which results in 100 percent diffraction of both S and P polarizations is chosen.

It can be seen that by varying the thickness of the hologram, various amounts of beamsplitting and/or polarization separation are possible. Also, by diffracting 100 percent of the beam, angular selection is possible.

In designing the hologram assembly 34, hologram 18 is made such that beam 14 hits hologram 18 at the angle $\theta_I$ which is the Bragg angle for hologram 18. Hologram 30 is designed such that beam 22 hits hologram 30 at an angle $\theta_I$ which is the Bragg angle for hologram 30. Beam 20 hits hologram 30 at an angle at which it experiences no diffraction and is transmitted. The exact angles and hologram thickness is determined by using equations (11) and (12) to obtain the desired diffraction efficiency for each beam.

In a preferred embodiment, hologram system 10 acts as a polarization beamsplitter. Beam 20 contains approximately 100 percent of the S-polarization and beam 22 contains approximately 100 percent of the P-polarization of beam 14. Beam 22 exits hologram 30 at an angle of 2.0 degrees relative to beam 20. In this preferred embodiment of assembly 34, for hologram 18, T equals 13.9 μm, $\alpha 1$ equals 3.81 degrees and $\beta 1$ equals 37.47 degrees. In the case of hologram 30, T equals 13.5 μm, $\alpha 1$ equals 2.22 degrees and $\beta 1$ equals 37.47 degrees.

Once the thickness T and the desired angles are determined, the hologram is manufactured. In order to record the hologram it is necessary to use a light wave length which will react with the hologram material. In a preferred embodiment, dichromated gelatin is used as the hologram material and a recording wavelength $\lambda_2$ of approximately 488 nanometers is used.

Figure 4:
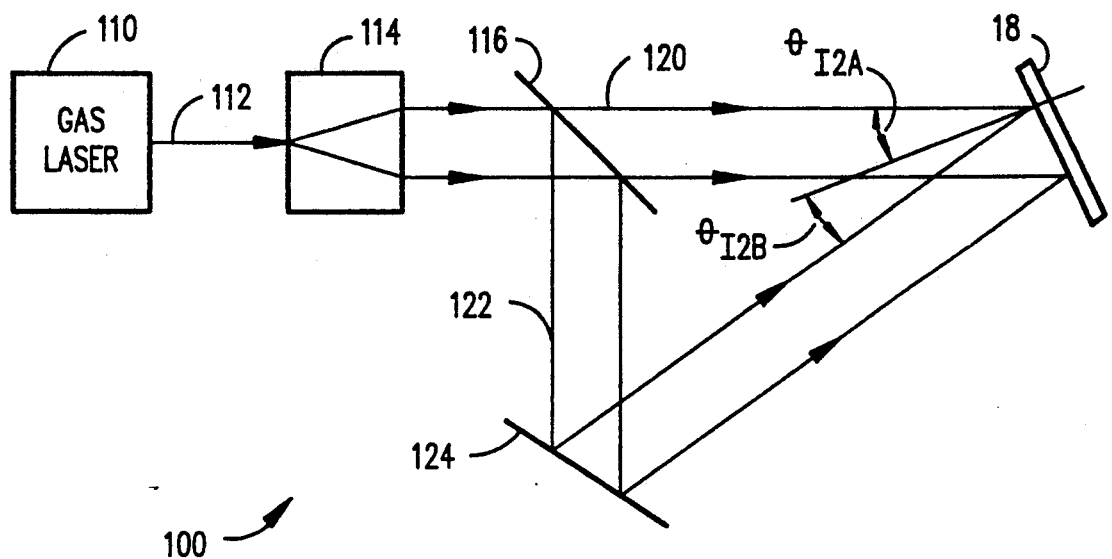
FIG. 4 is a schematic diagram of a system for making the holograms of the present invention.

FIG. 4 shows a schematic diagram of a system for manufacturing the hologram 18 and is designated by the general reference number 100. System 100 has a gas laser 110 which emits a light beam 112 at the recording wavelength $\lambda_2$. Beam 112 is expanded by a beam expander 114. A beamsplitter 116 splits beam 112 into an object beam 120 and an image beam 122. Beam 122 is reflected by a mirror 124 to hologram 18. Beams 120 and 122 intersect at the hologram 18 at recording external incident angles of $\theta_{12A}$ and $\theta_{12B}$. The angles $\theta_{12A}$ and $\theta_{12B}$ are determined by the conditions of the desired hologram (L, $\phi$) as was described above. The recording internal angles of incidence are $\alpha_{2A} = \phi - \pi/2 - \mathrm{asin}[\lambda_2/2n_0L]$ and $\alpha_{2B} = \phi - \pi/2 + \mathrm{asin}[\lambda_2/2n_0L]$. From Snells Law, $\theta_{12A} = \mathrm{asin}[n_0 \sin\beta_{2A}]$ and $\theta_{12B} = \mathrm{asin}[n_0 \sin\alpha_{2B}]$. The hologram material 50 of hologram 18 is thereby exposed to light of $\lambda_2$ at angles $\theta_{12A}$ and $\theta_{12B}$. The result is that the desired Bragg planes are recorded into the film. A similar process is used to make hologram 30. It should be noted that in the equations of this paragraph, $n_0$ is the index of refraction of the unprocessed hologram material and is in the range of 1.51–1.56 (approximately 1.53) for dichromated gelatin.

Figure 5:
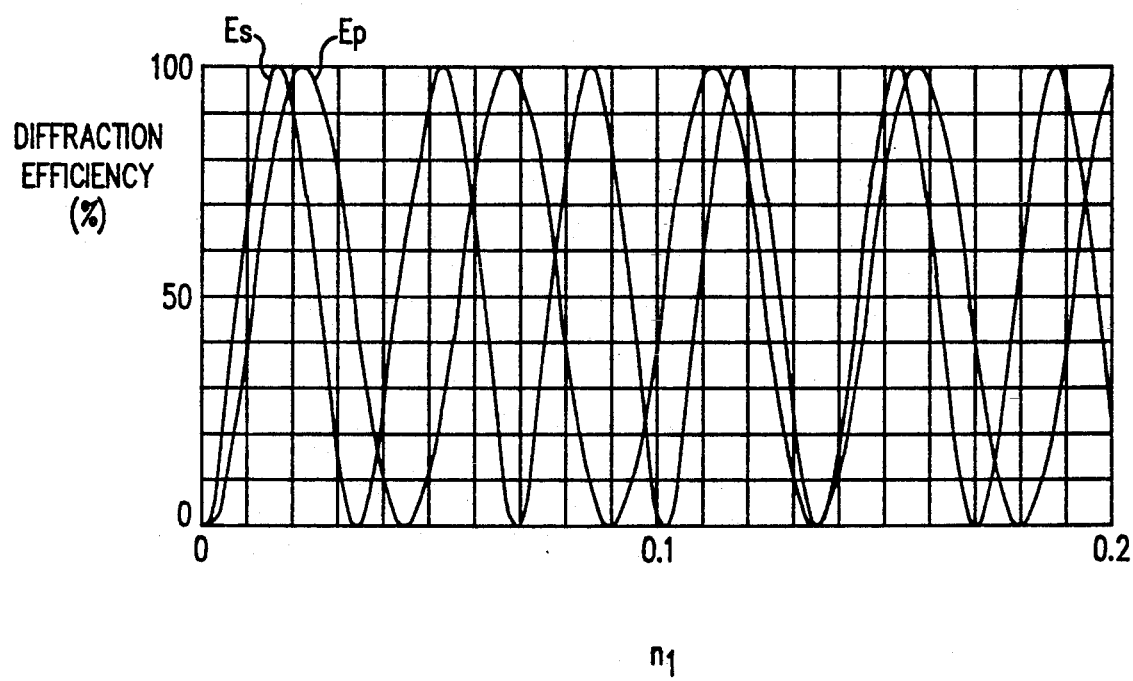
FIG. 5 is a graph of diffraction efficiency versus the peak change in index of refraction of the hologram medium.

FIG. 5 shows a graph of diffraction of efficiency versus $n_1$ (peak change in index of refraction of the hologram medium). This graph is for a hologram having a thickness T of 20 microns, $n_0 = 1.26$, $\lambda_a = 780$ nanometers, $\theta_1 = 0$ degrees, and $\beta_1 = 41.41$ degrees. This graph is used to illustrate the fact that the polarization efficiency of the hologram also varies with $n_1$. Therefore, an alternative way to make the holograms of the present invention is to use a standard thickness (T) and then solve equations (11) and (12) by selecting the desired $n_1$. The term $n_1$ depends on the amount of time the hologram is exposed to light during the manufacturing process as described in FIG. 4. Therefore, by proper timing of the exposure of the hologram in the process, the desired properties of the hologram are obtained.

Figure 6:
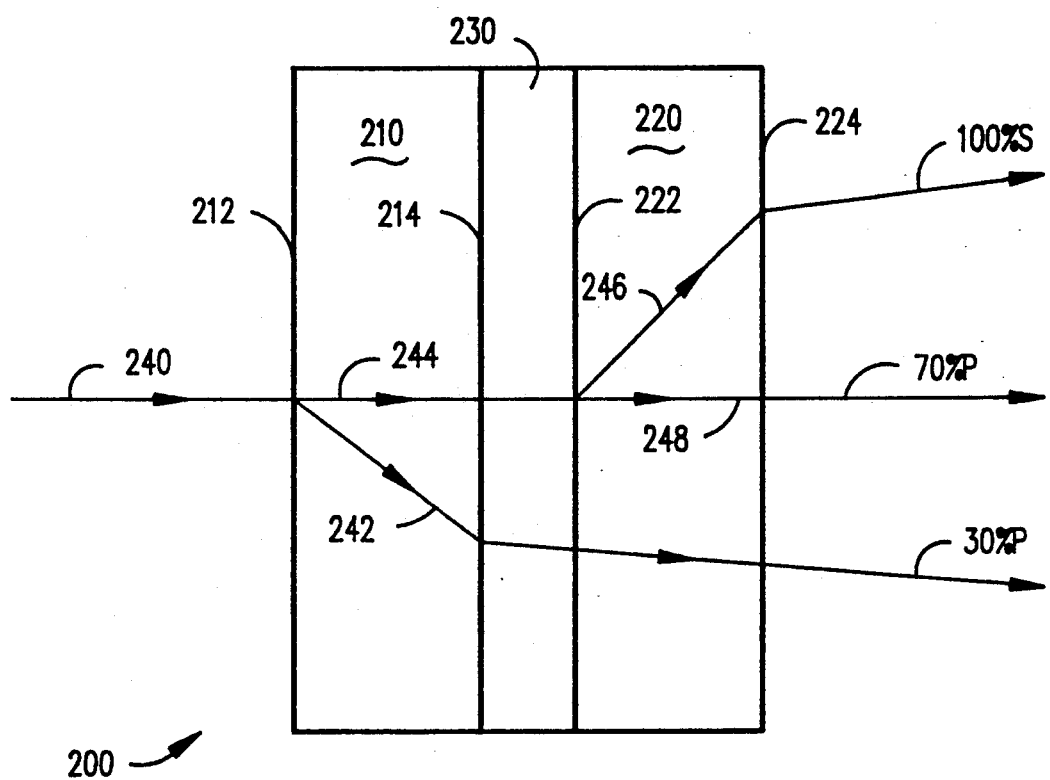
FIG. 6 is a schematic diagram of an alternative embodiment of the present invention.

FIG. 6 shows a cross sectional view of a multiple hologram and is designated by the general reference number 200. Hologram 200 may be used where it is desired to split a beam into three separate beams. This may be desired in optical storage systems for providing a separate beam for purposes of providing servo information and will be discussed in more detail with reference to FIG. 10 below. Hologram 200 has a substrate 210 which has a beamsplitting hologram 212 on one surface and a beam directing hologram 214 on a second surface. A substrate 220 has a beamsplitting hologram 222 on one surface and a beam directing hologram 224 on a second surface. Substrates 210 and 220 may be made of glass and are secured together by optical cement 230 such as an ultraviolet cured adhesive which has an index of refraction approximately equal to the substrate. Substrates 210 and 220 are preferably 1–2 mm thick.

A light beam 240 ($\lambda_1 = 780$ nanometers) enters beamsplitting hologram 212 at the Bragg angle of the hologram 212. Hologram 212 is designed to diffract 30 percent of the P polarized light of beam 240 as a beam 242 and zero percent of the S polarized light of beam 240. The remaining portion of beam 240 (now referred to as beam 244) containing 70 percent P polarized light and 100 percent S polarized light of beam 240 is transmitted by hologram 212 without diffraction. In a preferred embodiment of hologram 212, T equals 14.86 microns, $\alpha_1 = 0$ degrees and $\beta_1 = 24.8$ degrees.

Beam 242 enters beam directing hologram 214 at the Bragg angle of that hologram 214. Beam 242 is 100 percent diffracted by hologram 242 to a new angle. Beam 244 enters hologram 214 at a non-Bragg angle such that it does not experience any diffraction. In a preferred embodiment of hologram 214, T = 29.7 microns, $\alpha_1 = 24.8$ degrees and $\beta_1 = 4.2$ degrees.

Beam 244 enters hologram 222 at the Bragg angle of that hologram. Approximately one hundred percent of the S polarized light of beam 244 is diffracted as a beam 246. The remaining P polarized light of beam 244 (now referred to as beam 248) is undiffracted. Beam 242 enters hologram 222 at a non-Bragg angle and is not diffracted. In a preferred embodiment of hologram 222, T = 17.4 microns, $\alpha_1 = 0$ degrees and $\beta_1 = 36.9$ degrees.

Beam 246 enters hologram 224 at the Bragg angle of that hologram and is approximately 100 percent diffracted to a new angle. The beams 248 and 242 each enter hologram 224 at a non-Bragg angle such that they are not diffracted. In a preferred embodiment of hologram 224, T=31.3 microns, $\alpha_1=36.9$ degrees, and $\beta_1=5.7$ degrees.

The result of hologram system 200 is that beam 240 is separated into three beams 242, 248 and 246 containing 30 percent P polarized light, 70 percent P polarized light, and 100 percent S polarized light, respectively, of the original beam 240. The holograms 212 and 222 divide the beams while holograms 214 and 224 adjust the output beams to the desired angles.

It can be seen that by using the hologram in a manner taught by the present invention, any desired beam separation and angle adjustment may be achieved.

Figure 7:
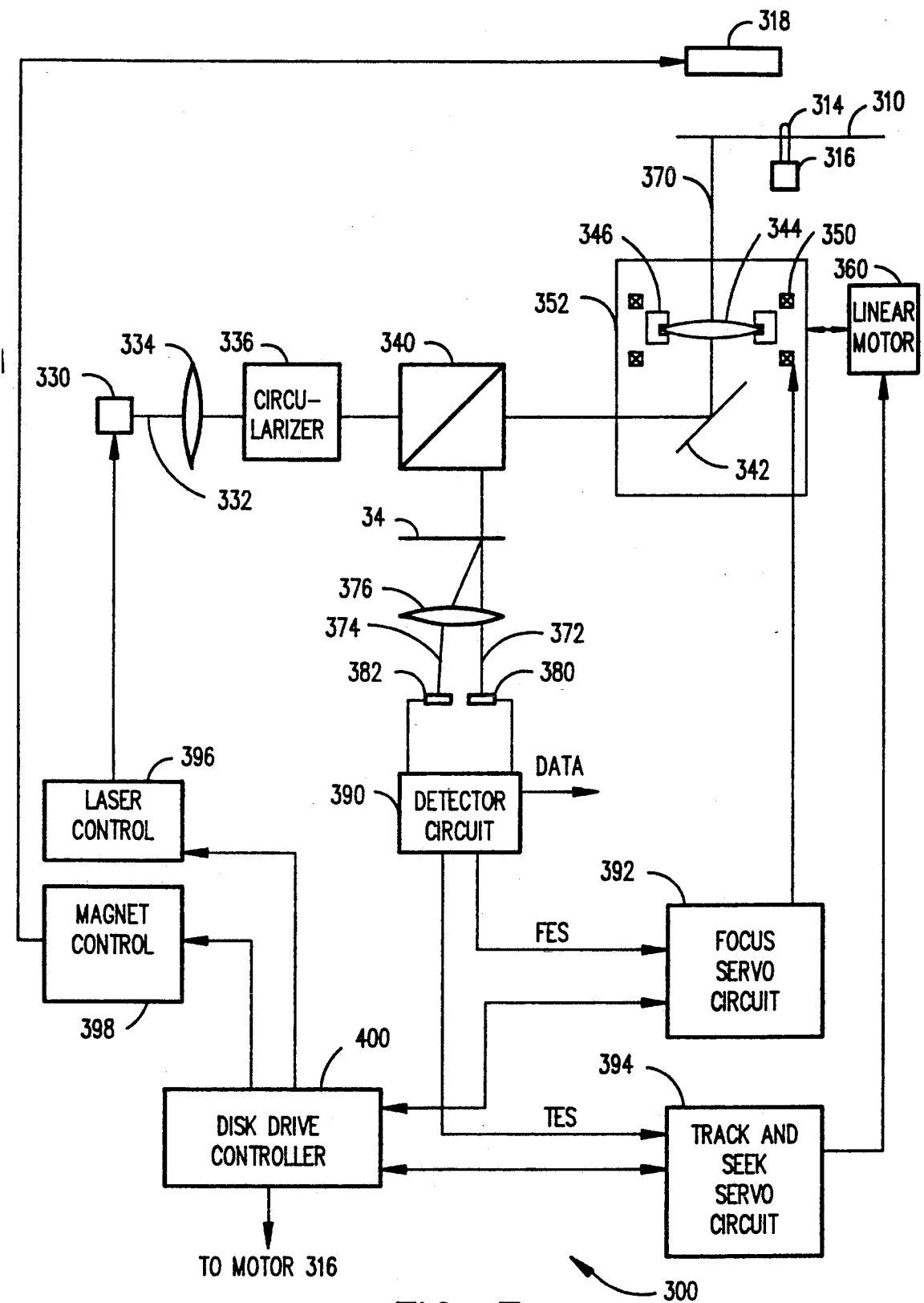
FIG. 7 is a schematic diagram of an optical data storage system of the present invention.

The present invention may be used in optical data storage systems. FIG. 7 shows a schematic diagram of an optical data storage system of the present invention and is designated by the general reference number 300. System 300 includes an optical data storage medium 310 which is preferably disk-shaped. Medium 310 is preferably a magneto-optic medium. Medium 310 is removably mounted to a clamping spindle 314 as is known in the art. Spindle 314 is attached to a spindle motor 316. Motor 316 rotates spindle 314 and medium 310. A bias electro-magnet 318 is located above medium 310.

A laser 330 generates a light beam 332. Laser 330 may be a gallium-aluminum-arsenide diode laser which produces light at approximately 780 nm in wavelength. Beam 332 is collimated by a lens 334 and is circularized by a circularizer 336. Circularizer 336 may be a circularizing prism. Beam 332 passes through a beamsplitter 340. Beam 332 is then reflected by a mirror 342 to a lens 344. Lens 344 focuses beam 332 to medium 310. Lens 334 is mounted to a lens holder 346. Holder 346 may be moved up or down relative to medium 310 by a focus actuator motor 350 which may be voice coil motor.

Mirror 342, lens 344, holder 346 and motor 350 comprise an optical head 352. Head 352 may be moved in a radial direction relative to medium 310 by a linear motor 360.

A portion of beam 332 is reflected by medium 310 as a beam 370. Beam 370 passes through lens 344 and is reflected by mirror 342 to beamsplitter 340. At beamsplitter 340, beam 370 is reflected to hologram assembly 34. At assembly 34, beam 370 is divided into a beam 372 and 374 which correspond to beams 20 and 22, respectively, as shown in FIG. 1.

Beams 372 and 374 are focussed by a lens 376 to a segmented optical detector 380 and a single optical detector 382, respectively. Detectors 380 and 382 are connected to a detector circuit 390. Detector circuit 390 outputs a data signal, a focus en-or signal (FES) and a tracking error signal (TES). A focus servo 392 is connected to circuit 390 and to motor 350. A track and seek servo 394 is connected to detector circuit 390 and to linear motor 360. A laser control 396 is connected to and provides power to laser 330. A magnet control 398 is connected to and provides power to magnet 318. A disk drive controller 400 is connected to and controls motor 316, servos 392 and 394, laser control 396 and magnet control 398. Servos 392 and 394, laser control 396, magnet control 398 and controller 400 are all known in the art.

Figure 8:
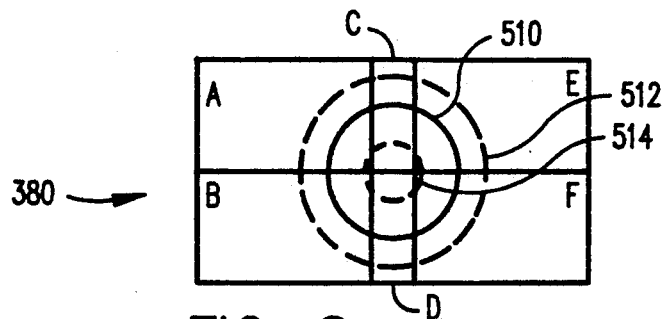
FIG. 8 is a top view of an optical detector of FIG. 7.

FIG. 8 shows a top view of detector 380. The detector 380 is divided into six sections 380A, B, C, D, E and F.

Figure 9:
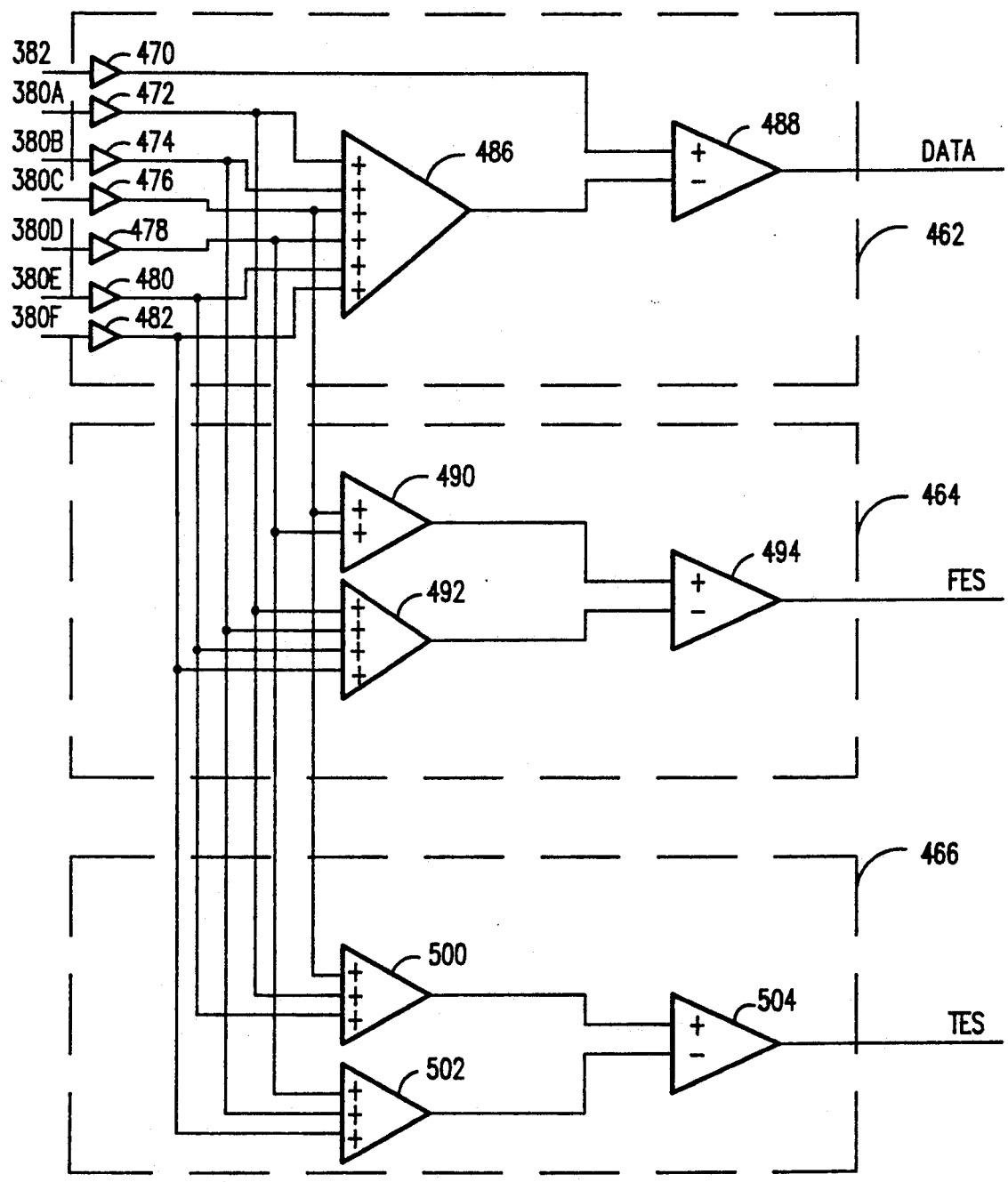
FIG. 9 is a circuit diagram for the system of FIG. 7.

FIG. 9 shows a circuit diagram of a detector circuit 390. Circuit 390 comprises a data circuit 462, a focus error circuit 464, and a tracking error circuit 466. Data circuit 462 has an amplifier 470 connected to detector 442 and a plurality of amplifiers 472, 474, 476, 478, 480 and 482 connected to optical detector segments 380A, B, C, D, E and F, respectively. Amplifiers 472-482 are connected to a summing amplifier 486. Amplifier 470 and amplifier 486 are connected to a differential amplifier 488. The output amplifier 488 is the data signal.

The focus error circuit 464 comprises a pair of summing amplifiers 490 and 492, and a differential amplifier 494. Amplifier 490 is connected to amplifiers 476 and 478. Amplifier 492 is connected to amplifiers 472, 474, 480 and 482. Amplifiers 490 and 492 are connected to differential amplifier 494 and the output of amplifier 494 is the focus error signal (FES).

Tracking error circuit 466 comprises a pair of summing amplifiers 500 and 502, and a differential amplifier 504. Amplifier 500 is connected to amplifiers 472, 476 and 480. Amplifier 502 is connected to amplifiers 474, 478 and 482. Amplifier 504 is connected to amplifiers 500 and 502 and outputs a tracking error signal (TES).

The operation of system 300 may now be understood. When it is desired to write data onto medium 310, magnet 318 and laser 330 are turned on. Laser 330 produces a write beam 332 which is of sufficient intensity to heat spots on medium 310 to a temperature above its Curie temperature. At this temperature, the spots will align with the magnetic field produced by magnet 318. Laser 330 is controlled to provide a pulsed beam 332 representative of the data to be recorded. The data is thus recorded as spots on medium 310 which have an up or down magnetic orientation.

During the write operation, reflected beam 370 returns to hologram element 34. The beam 370 is divided into an S-polarization component beam 374 and a P-polarization component beam 372. See FIG. 8. When beam 332 is exactly focussed on medium 310, beam 372 will have a circular cross-section 510 on detector 380. The amount of light hitting areas C and D will be approximately equal to the amount of light hitting areas A, B, E and F, and will cause circuit 462 to output a zero focus error signal. If beam 332 is slightly out of focus one way or the other, beam 372 will fall as a circular cross-section 512 or 514 on detector 380. This will cause circuit 464 to output a positive or negative focus error signal. The focus error signal is used to control motor 350 to move lens 344 until the focus is again achieved.

If beam 332 is focussed exactly on a track of medium 310, then beam 372 will fall as a circular cross-section 510 equally between the sections A, C and E, and the sections B, D and F. If beam is off track it will fall more on sections A, C and E, and less on sections B, D and F, or visa versa. This will result in a positive or negative tracking error signal being produced by circuit 390. This tracking error signal is then used to control motor 360 to move head 352 until the beam is once again on track.

When it is desired to read data recorded on the disk, laser 330 is energized to produce a read beam 332. Read beam 332 is of low enough intensity such that medium 310 is not heated to above its Curie temperature. The beam 332 is focussed by a lens 344 onto medium 310. The data has already been recorded on the medium as up or down oriented magnetic domains. Light reflected from the medium has its plane of polarization rotated one way or the other depending on the orientation of the magnetic domains. The reflected beam 370 returns and is divided into beam 372 and 374 at hologram element 34. The S-polarization component beam 374 is detected by a detector 382 and the P-polarization component beam 372 is detected by detector 380. Circuit 390 compares the intensity of the two beams and outputs a data signal which is representative of the data recorded medium 310.

Figure 10:
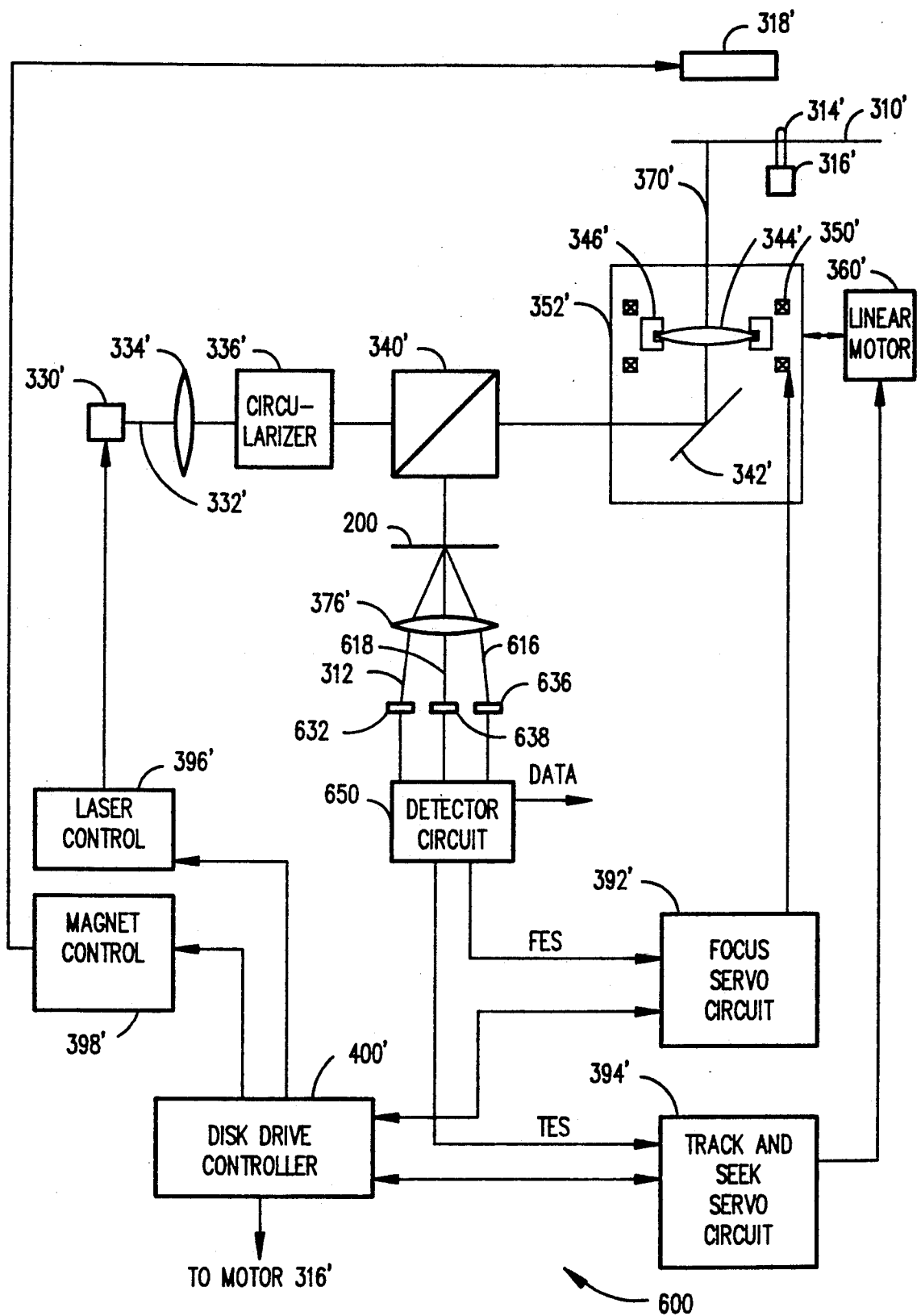
FIG. 10 is a schematic diagram of an alternative optical data storage system of the present invention.
Figure 11:
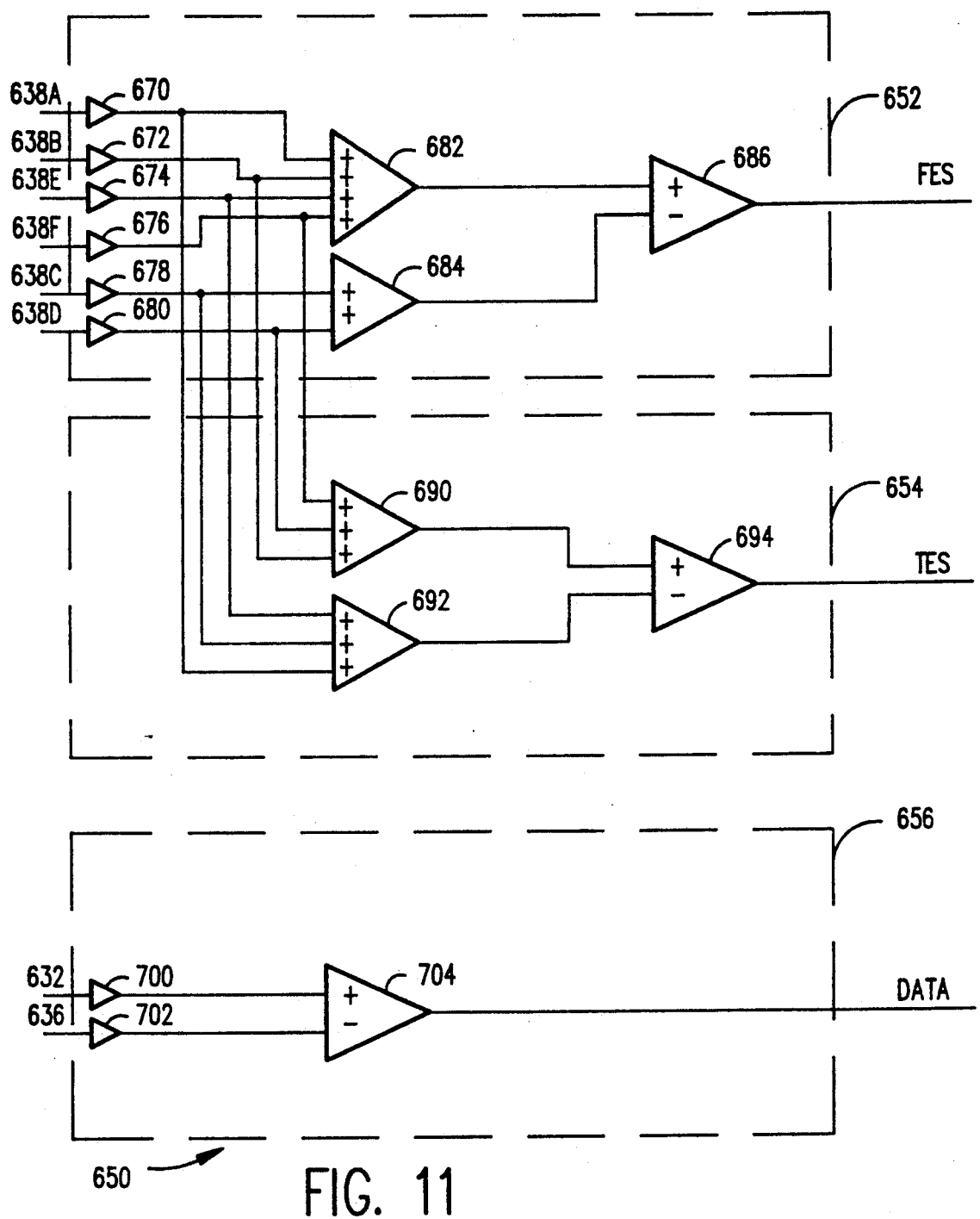
FIG. 11 is a circuit diagram for the optical data storage system of FIG. 10.

FIG. 10 shows a schematic diagram of an alternative embodiment of the optical data storage system of the present invention and is designated by the general reference number 600. Elements of system 600 which are similar to elements of system 300 are designated by a prime number. The system 600 uses hologram element 200 to divide the returning beam 370' into three beams in order to achieve separate data and servo detection.

At hologram element 200, beam 370' is divided into beams 612, 616 and 618 which are similar to beams 242, 246 and 248, respectively, of FIG. 6. Beam 612 and 616 are focussed to optical detectors 632 and 636, respectively. Beam 618 is focussed to a segmented optical detector 638 which is similar to detector 380 of system 300. The detectors 632, 636 and 638 are connected to a detector circuit 650.

FIG. 1 1 shows a circuit diagram of the detector circuit 650. Circuit 650 is comprised of a FES circuit 652, a TES circuit 654, and a data circuit 656. Circuit 652 comprises a plurality of amplifiers 670-680, a pair of summing amplifiers 682 and 684, and a differential amplifier 686. Circuit 654 comprises a pair of summing amplifiers 690 and 692, and a differential amplifier 644. Circuit 656 comprises a pair amplifiers 700 and 702, and a differential amplifier 704. Amplifier 700 is adjusted relative to amplifiers 702 in order to compensate for differences in intensity caused by element 200.

The operation of system 600 is the same as that described above for system 300, the only difference being the additional separation of the servo beam 618 from the data beams 612 and 616.

Figure 12:
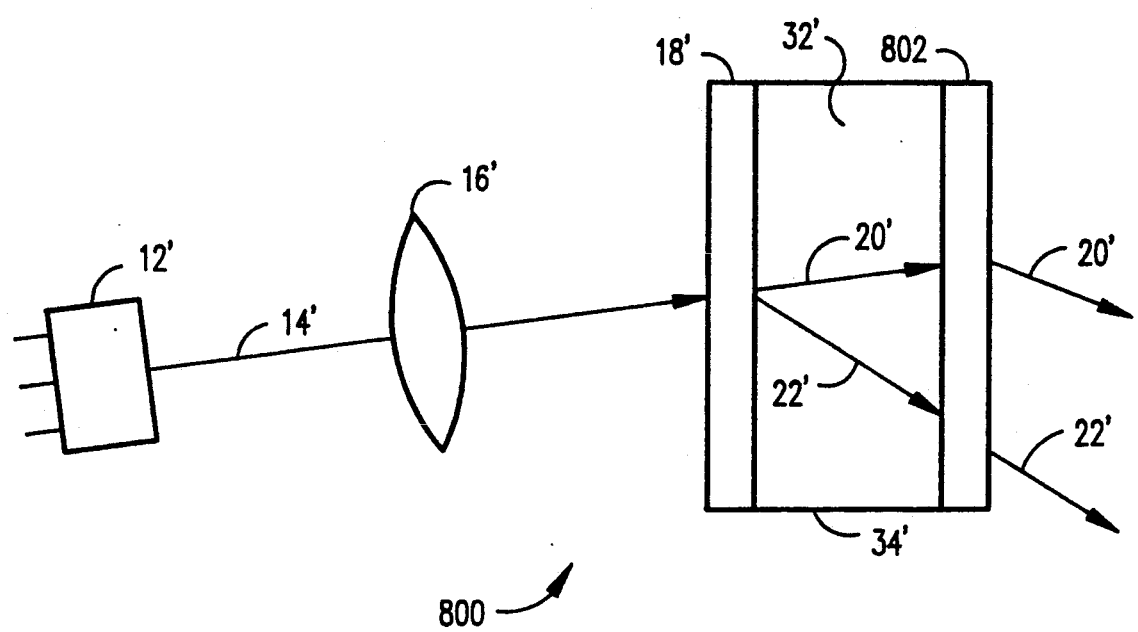
FIG. 12 is a schematic diagram of an alternative embodiment of the present invention.

FIG. 12 shows an alternative hologram assembly which is referred to by the general reference number 800. Assembly 800 is similar to assembly 34 of FIG. I with the exception that a hologram 802 replaces hologram 30. In assembly 800, hologram 802 diffracts beam 20' to a desired angle and allows beam 22' to pass undiffracted. This is contrast to hologram 30 which diffracts beam 22 instead. Beam 20' contains approximately 100 percent of the S polarized light and beam 22' contains approximately 100 percent of the P polarized light of beam 14'. Beam 22' exits hologram 802 at an angle of 2.0 degrees relative to beam 20'. In a preferred embodiment for hologram 802, T equals 17.7 $\mu$m, $\alpha 1$ equals 3.81 degrees, and $\beta 1$ equals 30.28 degrees.

The present invention may also be used in a direct read after write (DRAW) optical data storage system. DRAW systems require two beams: one to write and another to read what has just been written. The hologram element of the present invention may be used to divide a single laser beam into the two beams, with each beam having a desired intensity level. This would reduce the cost of the optical systems since an additional laser would not be required.

The advantages of the present invention may now be understood. The present invention teaches a hologram system which can be used to divide a single beam in to multiple beams of any desired strength, polarization and angular separation. The first hologram divides the beam and the second hologram adjusts the angular separation.

It should be noted that the present invention teaches a volume hologram system in which any desired beam angle may be selected. In some prior art volume holograms systems, it was required that the hologram diffract the beam at 90 degrees from the transmitted beam in order to achieve high efficiency. In contrast, the present invention teaches a hologram system which achieves high efficiencies at diffraction angles less than 90 degrees.

While the invention has been particularly shown and described with reference to particular embodiments thereof, it will be understood by those skilled in the art the various other changes in form and details may be made therein without departing from the spirit and scope of the invention.

We claim:

1. A hologram system comprising:
   a radiation source;
   a first volume hologram, made of processed dichromated gelatin having an index of refraction of approximately 1.26, receiving a radiation beam from the radiation source and diffracting a first portion of the radiation beam as a first beam and transmitting a second portion of the radiation beam as a second beam, the first and second beams having an angular separation of less than 90 degrees; and
   a second volume hologram, made of processed dichromated gelatin having an index of refraction of approximately 1.26, receiving the first and second beams and transmitting one of said beams undiffracted as a transmitted beam and diffracting a remaining beam at an angle different from the transmitted beam.

2. The system of claim 1, wherein the first and second beams have different intensities.

3. The system of claim 1, wherein the first and second beams contain different percentages of polarization components of the radiation beam from the radiation source.

4. The system of claim 1, wherein the diffraction efficiency of the first and second holograms is determined by the thickness of each hologram.

5. The system of claim 1, wherein the diffraction efficiency of the first and second holograms is determined by the peak change in refractive indices of each hologram.

6. The system of claim 1, further including a substrate having a first and a second surface, the first hologram being located on the first surface and the second hologram being located on the second surface.

7. A method for using a hologram system comprising the steps of:
   generating a collimated beam of light;
   directing the beam of light to a first volume hologram, made of dichromated gelatin having an index of refraction of approximately 1.26, such that the first hologram diffracts a first portion of the beam of light into a first beam and transmits a second portion of the beam of light as a second beam, the first and second beams having an angular separation of less than 90 degrees; and
   directing the first and second beams to a second volume hologram, made of processed dichromated gelatin having an index of refraction of approximately 1.26, the second hologram transmitting one of said beams undiffracted as a transmitted beam and diffracting a remaining beam at an angle different from the transmitted beam.

8. A hologram system comprising:
a radiation source for producing a radiation beam;
an optical data storage medium;
a radiation transmission means for directing the radiation beam from the radiation source to the optical data storage medium; and
an optical reception means for receiving a reflected radiation beam from the optical storage medium, the optical reception means having a volume hologram system, made of processed dichromated gelatin having an index of refraction of approximately 1.26, for separating the reflected radiation beam into a plurality of beams, one of said plurality of beams being transmitted undiffracted as a transmitted beam and one of said plurality of beams being diffracted at an angle different from the transmitted beam.

9. The system of claim 8, wherein the volume hologram system comprises a first volume hologram for receiving the reflected radiation beam and diffracting a first portion of the reflected radiation beam as a first beam and transmitting a second portion of the reflected radiation beam as a second beam, and a second volume hologram receiving the first and second beams and transmitting one of said beams undiffracted as a transmitted beam and diffracting a remaining beam at an angle different from the transmitted beam.

10. The system of claim 8, wherein the volume hologram system comprises a first volume hologram receiving the reflected radiation beam and diffracting a first portion of the reflected radiation beam as a first beam and transmitting a second portion of the reflected radiation beam as a second beam, a second volume hologram receiving the first and second beams and diffracting one of said first and second beams at a desired angle and transmitting a remaining one of the first and second beams undiffracted, a third volume hologram receiving the first and second beams and diffracting a portion of one of said first and second beams as a third beam and transmitting a remaining portion of the said beam as a fourth beam and transmitting a remaining beam undiffracted and a fourth volume hologram receiving the three beams from the third volume hologram and diffracting one of said three beams at a desired angle, and transmitting two of said three beams undiffracted.

11. A hologram system comprising:
a radiation source;
a first volume hologram, made of processed dichromated gelatin having an index of refraction of approximately 1.26, receiving a radiation beam from the radiation source and defracting a p polarization component of the radiation beam as a p polarization beam and transmitting an s polarization component of the beam as an s polarization beam; and
a second volume hologram, made of processed dichromated gelatin having an index of refraction of approximately 1.26, receiving the s and p polarization beams and transmitting one of said beams undiffracted as a transmitted beam and diffracting a remaining beam at an angle different from the transmitted beam.

12. The system of claim 11, wherein the diffraction efficiency of the first and second holograms is determined by the thickness of each hologram.

13. The system of claim 1, wherein the diffraction efficiency of the first and second holograms is determined by the peak change in refractive indices of each hologram.

14. The system of claim 11, further including a substrate having a first and a second surface, the first hologram being located on the first surface and the second hologram being located on the second surface.

15. A hologram system comprising:
a radiation source;
a first volume hologram receiving a radiation beam from the radiation source and diffracting a first portion of the radiation beam as a first beam and transmitting a second portion of the radiation beam as a second beam;
a second volume hologram receiving the first and second beams and diffracting one of said first and second beams at a desired angle and transmitting a remaining beam;
a third volume hologram receiving the first and second beams and diffracting a portion of one of said first and second beams as a third beam and transmitting a remaining portion of said beam as a fourth beam and transmitting a remaining beam undiffracted; and
a fourth volume hologram receiving the three beams from the third volume hologram and diffracting one of said three beams at a desired angle, and transmitting two of said three beams undiffracted.

16. The hologram system of claim 15, wherein the first, the second, the third, and the fourth volume holograms are made of processed dichromated gelatin having an index of refraction of approximately 1.26.

17. The hologram system of claim 15, wherein the first and third volume holograms diffract the beams into portions having different intensities.

18. The hologram system of claim 15, wherein the first and third volume holograms diffract the beams into portions having different polarization components.

* * * * *

UNITED STATES PATENT AND TRADEMARK OFFICE
CERTIFICATE OF CORRECTION

PATENT NO. : 5,272,550
DATED : Dec. 21, 1993
INVENTOR(S) : L. D. Dickson, F. S. Luecke It is certified that error appears in the above-indentified patent and that said Letters Patent is hereby corrected as shown below:

Column 3, line 27, after "angle" delete $\underline{(}$

Column 4, line 60, after "and" --add $\lambda$a--

Column 7, line 54, delete $\underline{\text{en-or}}$ and add --error--

Column 9, line 25, delete $\underline{1\ 1}$ and add --11--

Column 10, line 55, after "made of" add --processed--

Column 12, line 13, delete $\underline{1,}$ and add --11,--

Signed and Sealed this

Twenty-third Day of May, 1995

Attest:

BRUCE LEHMAN

*Attesting Officer*   *Commissioner of Patents and Trademarks*